United States Patent [19]
Bettega et al.

[11] Patent Number: 5,693,988
[45] Date of Patent: Dec. 2, 1997

[54] FILTERING DEVICE

[75] Inventors: Eric Bettega, Meylan; Miaoxin Wang, Grenoble, both of France

[73] Assignees: Schneider Electric SA; Electricite de France, both of France

[21] Appl. No.: 630,251

[22] Filed: Apr. 10, 1996

[30] Foreign Application Priority Data

May 11, 1995 [FR] France .................... 95 05806

[51] Int. Cl.⁶ .................................................. H02J 1/02
[52] U.S. Cl. .................................. 307/105; 333/172
[58] Field of Search ........................ 307/105; 333/167, 333/172–176; 323/205, 207–210; 363/39, 47, 48; 327/552, 553

[56] References Cited

U.S. PATENT DOCUMENTS

| | | | |
|---|---|---|---|
| 3,849,677 | 11/1974 | Stacey et al. | 333/176 |
| 3,900,792 | 8/1975 | Moltgen | 323/207 |
| 4,812,669 | 3/1989 | Takeda et al. | 307/105 |
| 5,347,441 | 9/1994 | Terada et al. | 363/39 |
| 5,513,090 | 4/1996 | Bhattacharya et al. | 307/105 |
| 5,548,165 | 8/1996 | Mohan et al. | 333/167 |

FOREIGN PATENT DOCUMENTS

| | | |
|---|---|---|
| 0254073 | 1/1988 | European Pat. Off. . |
| 0431967 | 6/1991 | European Pat. Off. . |
| 4123005 | 1/1992 | Germany . |

OTHER PUBLICATIONS

IEEE Transactions on Industry Applications, vol. 29, No. 1, Jan. 1993, pp. 144–152, "Compensation Characteristics of the Combined System of Shunt Passive and Series Active Filters".

EEEE Transactions on Electrical Power, vol. 4, No. 5, Sep. 1994, pp. 347–358, "Dynamic, Power–Quality–Oriented Approach to Power Theory and Compensation of Asymmetrical Systems Under Non–Sinusoidal Conditions".

*Primary Examiner*—Richard T. Elms
*Attorney, Agent, or Firm*—Parkhurst, Wendel & Burr, L.L.P.

[57] ABSTRACT

A filtering device, connected between an electrical power supply source and a load, comprises an active filter connected to the source and to the load, and a passive filter connected to the load. A voltage, generated between two terminals of the active filter, is monitored by first and second circuits. The first circuit receives a signal representative of a current, and monitors the voltage according to the signal representative of the current on input of the filtering device and to a first coefficient. The second circuit receives a signal representative of a voltage, and monitors the voltage according to the voltage signal and to a second coefficient. The first and second coefficients have values variable according to the frequency.

9 Claims, 3 Drawing Sheets

FILTERING DEVICE

BACKGROUND OF THE INVENTION

The invention relates to a filtering device comprising an input terminal connected to an electrical power source, an output terminal connected to an electrical load and a common input-output terminal connected to the source and to the load.

Passive filtering means and active filtering means are connected in series between the input terminal and the common terminal of the filtering device, the output terminal being connected to said active filtering means, said active filtering means comprising two terminals one of which is connected to the input terminal. Means for generating a filtering voltage is connected between said two terminals.

First monitor means of the active filtering means monitoring the filtering voltage between the two terminals of said active filtering means.

Current measuring means supplying the first monitoring means with first signals representative of the input current of the filtering device.

Filtering devices are used to eliminate or attenuate harmonic currents in electrical power distribution systems. These harmonic currents are caused by non-linear loads connected to the power distribution systems. The most common disturbing loads are chopper power supplies, converters or regulators comprising electronic power components.

An increase of the ratio of harmonic currents in the power distribution system is liable to disturb operation or to damage sensitive electrical loads. To limit the ratio of harmonic currents, it is known to use filtering devices connected to the power system lines.

The filtering devices generally comprise passive filters and active filters. The passive filters operate as current sinks and absorb the harmonics of frequencies appreciably equal to the resonance frequencies of said filters. The active filters enable a sinusoidal current to be re-established in the power system by compensating the currents deformed by non-linear loads. Compensation is performed by injecting a correction current in parallel into the power system. The power system current then corresponds to the sum of the deformed load current and of the correction current.

Filtering devices connected directly on the power system support all of the disturbances. This leads to overdimensioning of the filters, particularly when compensation of the harmonics is only required on one load or a group of predefined loads. To adopt harmonic current compensation to a load or a group, the filtering devices can comprise passive filters connected in parallel on the load and active filters connected to a power supply line of the load.

In the known arrangement described above, the passive filters eliminate the harmonic currents produced by the load and corresponding to the resonance frequencies of said passive filters. The active filters let the currents having a fundamental frequency pass between the power system and the load and limit the passage of the current harmonics. The passive filters are no longer supplied directly by the harmonic currents of the power system. The power absorbed by the passive filters depends essentially on the characteristics of the load.

Such an arrangement enables a good compromise to be achieved between a reduced absorption power of the passive filters and a good compensation of the harmonic currents. However, harmonics produced by the load, and whose frequencies are not provided for in the passive filters, cannot be removed to the power system. These harmonics will then manifest themselves in the form of voltage surges. The voltage harmonics ratio then increases at the terminals of the load and is liable to exceed an admissible level. The harmonic voltage surges of the power system are not sufficiently attenuated by the filtering device and can be added to those generated by the load.

SUMMARY OF THE INVENTION

The object of the invention is to achieve a filtering device enabling the ratio of harmonic currents and voltages applied to an electrical load to be reduced.

According to the invention this object is achieved by the fact that the filtering device comprises second means for monitoring the active filtering means and voltage measuring means supplying the second monitoring means with second signals representative of the voltage at the terminals of the passive filtering means or of the whole of the active and passive filtering means connected in series, the active filtering means comprising means for generating a filtering voltage between the two terminals of said active filtering means, monitored by the first and second monitoring means.

In a preferred embodiment, the filtering voltage of the active filtering means is determined by the value of the first signals corrected by a first coefficient variable according to the frequency, and by the value of the second signals corrected by a second coefficient variable according to the frequency.

The first coefficient has a low value at a frequency appreciably equal to the fundamental frequency of the source and a first predetermined high value for frequencies covering harmonics of said fundamental frequency, and the second coefficient has a low value at a frequency appreciably equal to the fundamental frequency of the source and a second predetermined high value for frequencies covering harmonics of said fundamental frequency.

According to a particular embodiment, the first coefficient has a low value at a frequency appreciably equal to the seventh harmonic of the frequency of the source. The passive filtering means comprise filters tuned to the fifth harmonic and to the eleventh harmonic of the frequency of the source.

In a development of the invention the first coefficient has a predetermined high value situated between one twentieth and five times a value representative of the impedance of compensating capacitors connected to the load, the impedance of the capacitors being determined for a frequency appreciably equal to the fundamental frequency of the source. The second coefficient has a predetermined high value lower than or equal to one.

The output terminal of the filtering device is connected to a common point of the active filtering means and the passive filtering means connected in series or to the input terminal of said filtering device.

BRIEF DESCRIPTION OF THE DRAWINGS

Other advantages and features will become more clearly apparent from the following description of illustrative embodiments of the invention, given as non-restrictive examples only and represented in the accompanying drawings in which.

DETAILED DESCRIPTION OF THE PREFERRED EMBODIMENT

Figure 1:
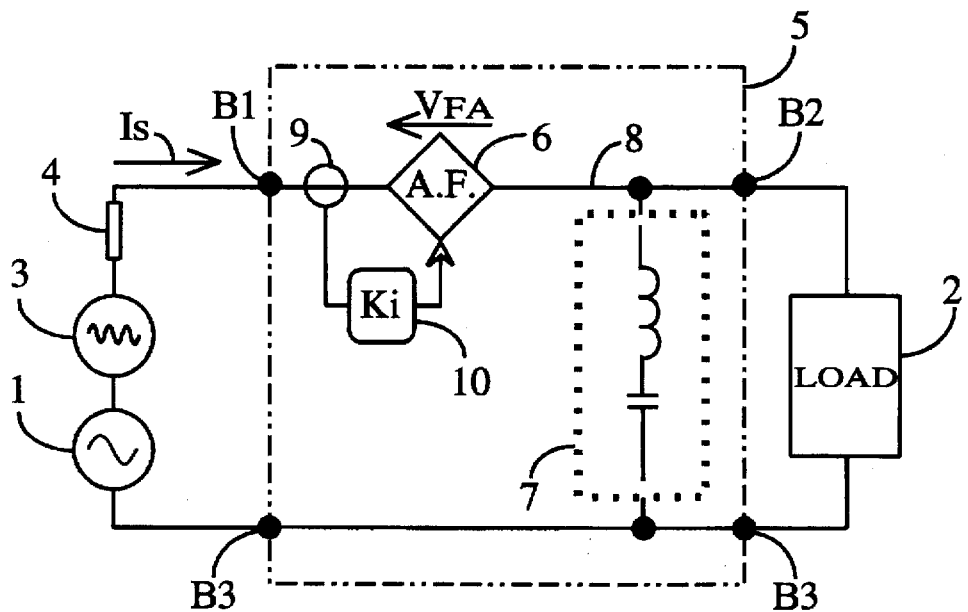
FIG. 1 represents a diagram of an electrical circuit comprising a known filtering device.

The electrical circuit of FIG. 1 comprises an electrical power source which supplies an electrical load 2. The power source is represented by a voltage generator 1. Harmonic disturbances generated by non-linear loads present upline from the device are represented by a second generator 3 connected in series with the voltage generator 1. An impedance 4, connected in series with the generator 1, represents the line impedance of the electrical circuit.

A filtering device 5, connected between the source and load, attenuates the harmonic disturbances applied to the load. An input terminal B1 of the device 5 is connected to the source 1, an output terminal B2 is connected to the load 2 and an input-output terminal B3 is connected to the source and the load. The filtering device comprises an active filter 6 and a passive filter 7 connected in series between the terminal B1 and the terminal B3. The active filter 6 is connected in series between the input terminal B1 and the output terminal B2, connecting the source 1 to the load 2 via a line 8. A current sensor 9 measures a current Is flowing in the line 8 at the input of the device 5 and supplies a signal representative of said current Is to a monitoring circuit 10.

The circuit 10 monitors a voltage VFA between a first and a second terminal of the active filter 6 connected on the line 8. The first terminal of the active filter is connected to the input terminal B1. The active filter 6 operates as a controlled impedance. The voltage VFA at its terminals is proportional to a coefficient Ki of the monitoring circuit. The value of Ki is very low or zero for a signal representative of the current Is of frequency of close to the fundamental frequency of the source. For components of Is far from the fundamental frequency, the value of Ki takes a maximum value Kimax. The equation representing the filter is:

$$VFA = Ki*Is$$

VFA is the voltage at the terminals of the active filter, Is the value of the measured current and Ki the coefficient variable according to the frequency. Ki is a quantity of the same nature as an impedance and can be expressed in ohms.

The passive filter 7, connected between the second terminal of the active filter and the terminal B3 is connected in parallel on the load 2. It absorbs the disturbances produced by the load if they are within predetermined resonance frequencies. Outside the absorption frequencies of the passive filter 7, the harmonic currents generated by the load and blocked by the active filter 6 give rise to harmonic voltage surges.

Figure 2:
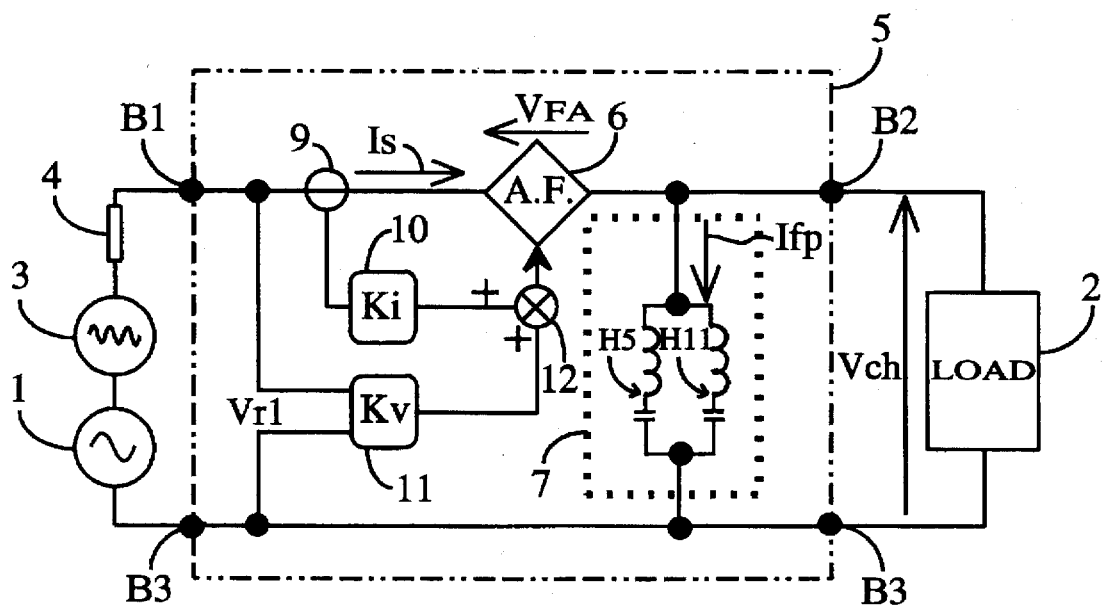
FIG. 2 represents a diagram of an electrical circuit comprising a filtering device according to a first embodiment of the present invention.

FIG. 2 shows an electrical circuit comprising a filtering device according to a first embodiment of the invention. The filtering device comprises a first monitoring circuit 10 receiving, as in FIG. 1, a signal representative of the current Is and a second monitoring circuit 11. The second monitoring circuit connected upline from the active filter receives a signal representative of a voltage Vr1 at the input of the filtering device between the terminals B1 and B3. A summer 12 connected between the monitoring circuits 10 and 11 and the active filter enables said circuits to monitor the voltage VFA at the terminals of the active filter.

The first circuit has a first coefficient Ki, variable according to the frequency. The coefficient Ki has a very low or zero value for a current Is of frequency appreciably equal to the fundamental frequency of the source and takes a maximum value Kimax for higher frequencies. The second circuit has a coefficient Kv, variable according to the frequency. Its value is low or zero for frequencies close to the fundamental Fo and equal to a maximum value Kvmax for different frequencies. The equation representing the active filter of FIG. 2 is:

$$VFA = Ki*Is + Kv*Vr1$$

The coefficient Ki is a quantity similar to an impedance and can be expressed in ohms. The coefficient Kv is dimensionless.

If the load 2 causes, for example, fifth harmonic H5, seventh harmonic H7 and eleventh harmonic H11 currents, and the passive filter 7 comprises resonant circuits which absorb the harmonics H5 and H11, then the harmonic H7 not being absorbed by the passive filter can cause harmonic voltage surges. To prevent voltage surges due to the seventh harmonic, the coefficient Ki has a minimum value at a frequency appreciably equal to said harmonic H7.

Figure 3:
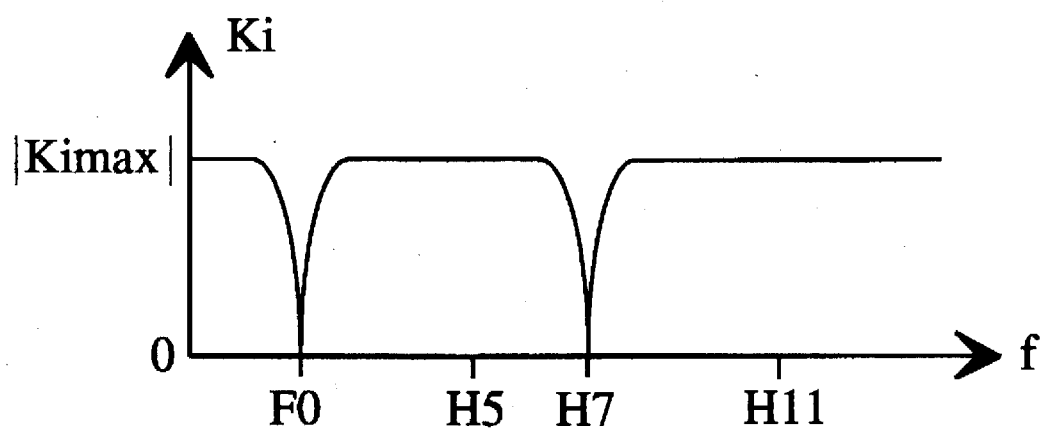
FIG. 3 shows the frequency variation of a first current signal correction coefficient.

FIG. 3 shows the variation of the coefficient Ki according to the frequency. The coefficient Ki has a low value for the fundamental component Fo and for the harmonic H7, The value of Ki increases and reaches a maximum value Kimax for frequencies far from Fo and H7, notably for the harmonics H5 and H11.

The part of the voltage VFA at the terminals of the active filter generated by the current Is and the coefficient Ki is small for the fundamental frequency Fo and the harmonic H7. The components Fo and H7 of the current Is can flow easily from the source to the load and from the load to the source.

Figure 4:
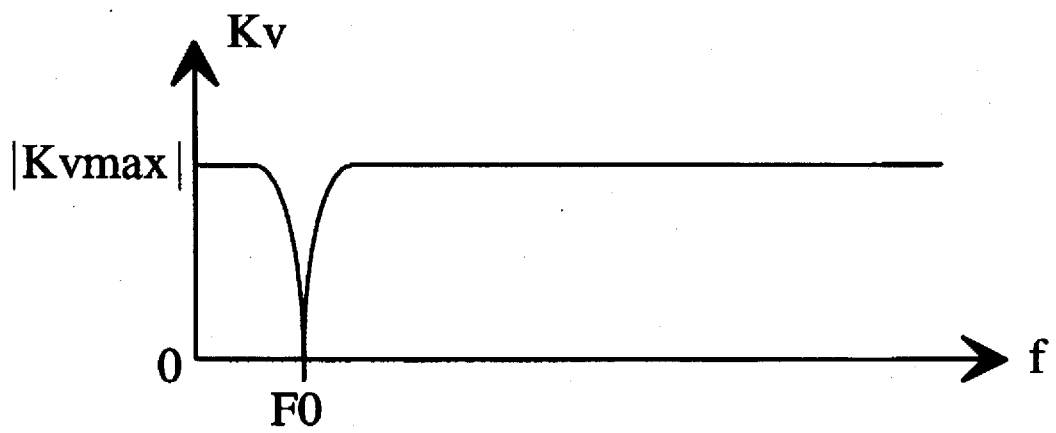
FIG. 4 shows the frequency variation of a second voltage signal correction coefficient.

FIG. 4 illustrates the variation of the coefficient Kv according to frequency. The coefficient Kv has a low value for the fundamental frequency Fo and a maximum value Kvmax for frequencies of Vr1 far from Fo. Measuring the voltage Vr1 upline from the active filter enables particularly the transfer of harmonic voltages from the source to the load to be limited.

The maximum value Kimax of the coefficient Ki is determined, for example, according to the impedance of compensating capacitors connected to the line 8. These capacitors are located notably in the resonant circuits. For passive filters able to absorb 125 A on a 220V AC power system of frequency Fo=50 Hz, the total value Cc of the capacity of the capacitors is about 3500 μF. The capacitors have at the fundamental frequency Fo an impedance Zc.

The expression of the value Zc is:

$$Zc = \frac{1}{2\Pi FoCc}$$

In this case, the value of Zc is about 1 ohm.

To have efficient filtering Kimax must preferably have a value greater than Zc/20. Too high values of Kimax are liable to destabilize the electrical circuit. It is preferable to choose a value of Kimax lower than 5*Zc.

The coefficient Kv is a dimensionless number. It enables a part of the voltage measured upline from the filter to be shifted onto the voltage at the terminals of the active filter. To maintain filter stability, the maximum value Kvmax of Kv must preferably be equal to or less than one.

Table 1 illustrates an example of harmonic ratio measurement in a circuit according to FIG. 2. A first column shows a pair of values: the ratio Kimax over the impedance Zc, and Kvmax.

A second column indicates a current harmonic ratio THD (Is). A third column indicates a voltage harmonic ratio THD (Vch) of a voltage Vch at the terminals of the load 2. A fourth column indicates the measurement of a current Ifp flowing in the passive filters 7.

TABLE 1

| Kimax/Zc; Kvmax | THD (Is) | THD (Vch) | Ifp |
|---|---|---|---|
| 0; 0 | 33% | 9.1% | 125 A |
| 1/10; 0.6 | 7.0% | 3.8% | 72 A |
| 1/10; 0.8 | 5.1% | 2.3% | 68 A |
| 1/10; 1.0 | 3.7% | 1.6% | 65 A |
| 1/2; 0.6 | 3.5% | 4.4% | 68 A |
| 1/2; 0.8 | 3.1% | 3.8% | 67 A |
| 1/2; 1.0 | 2.8% | 3.7% | 67 A |

The first line of table 1 shows values without compensation. The maximum values of the coefficients Kimax and Kvmax are zero. The initial ratios, THD(Is)=33% and THD (Vch)=9.1%, are predefined and represent harmonics ranging from a second harmonic H2 to a twenty-third harmonic H23.

The following lines of the table show the variations of the harmonic ratios and of the current absorbed by the passive filters. On the fourth line, the ratio Kimax/Zc is 1/10, Kvmax is equal to 1, and the voltage harmonic ratio THD(Vch) is reduced to 1.6%. On the seventh line the ratio Kimax/Zc is equal to 1/2 and the current harmonic ratio THD(Is) is reduced to 2.8%.

Figure 5:
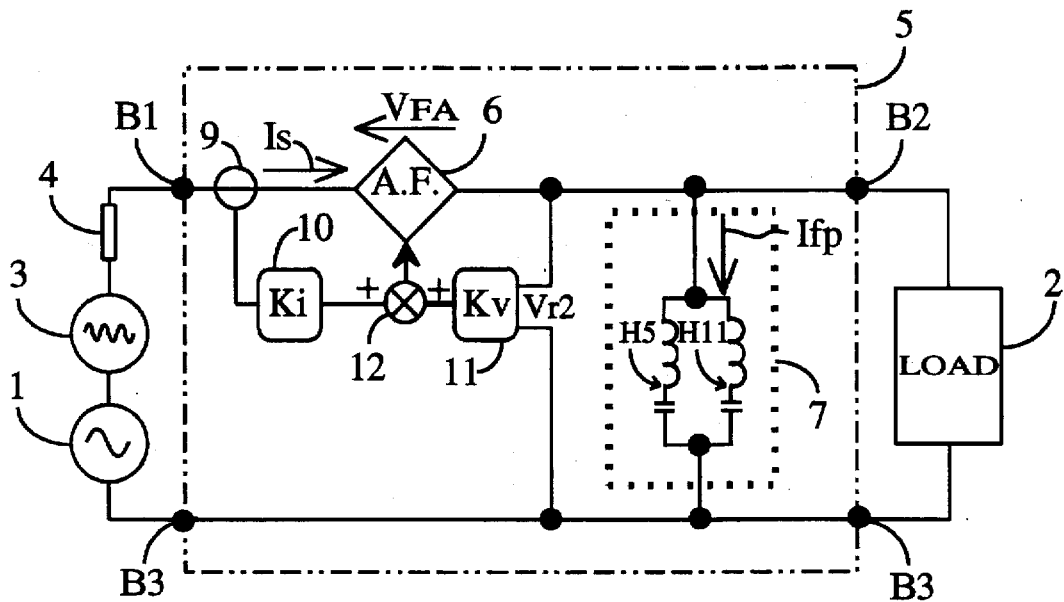
FIGS. 5 and 6 represent diagrams of electrical circuits comprising filtering devices respectively according to second and third embodiments of the present invention.

FIG. 5 shows a filtering device 5 according to a second embodiment of the invention. The second monitoring circuit 11 is connected downline from the active filter to the terminals of the passive filter and measures the output voltage Vr2 of the filter 5. This device enables a more efficient attenuation of the harmonic voltage surges on the load 2. The equation representing the active filter is:

$$VFA = Ki*Is + Kv*Vr2$$

This equation is similar to that of the first embodiment. The coefficients Ki and Kv have appreciably the same characteristics as the respective coefficients of FIGS. 2, 3 and 4.

Figure 6:
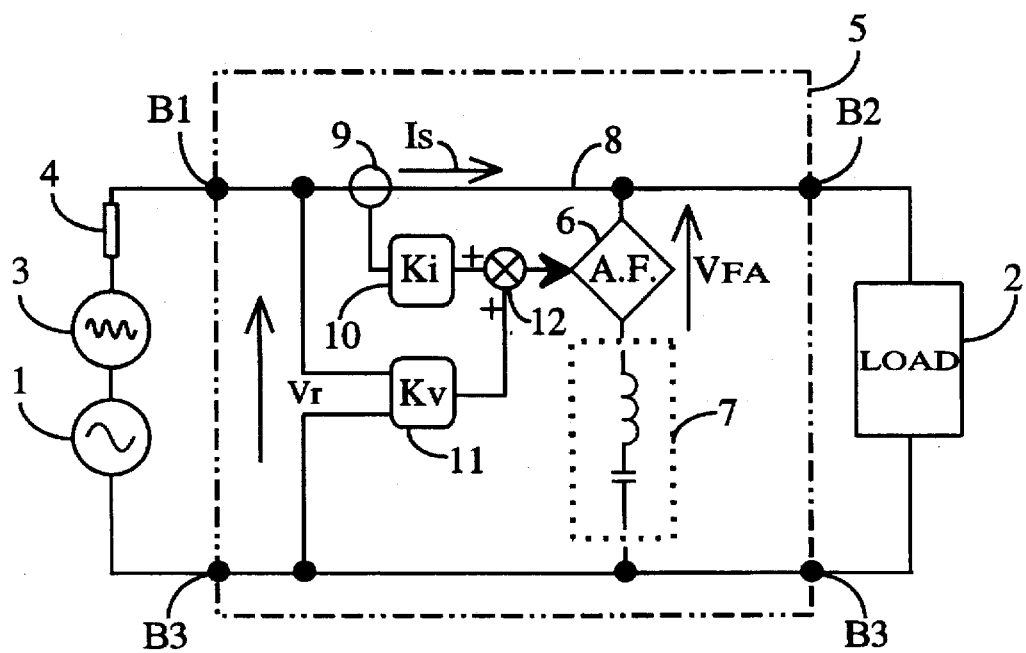

FIG. 6 represents a diagram of a circuit comprising a filtering device according to a third embodiment of the invention. The active filter 6 is connected in series with the passive filter between the terminals B3 and B2. The output terminal B2 is connected to the input terminal B1. The active filter and passive filter assembly is connected in parallel on the load 2. The voltage Vr is then measured between the terminals B2 and B3 or B1 and B3 of the filtering device 5. It can also be measured at the terminals of the passive filter 7. The harmonic currents and voltages are attenuated by branching in the two-filter assembly. The series arrangement of the active filters 6 and passive filters 7 enables, as in the first and second embodiments, the power to be dissipated by the passive filters to be limited.

The monitoring coefficients Ki and Kv illustrated in FIGS. 3 and 4 can have variations according to the frequency of very different shapes. The shapes of these coefficients will depend on the nature of the load, on the characteristics of the passive filters, and on the harmonic currents and voltages present on the power system.

For particular harmonics the coefficients Ki or Kv can take intermediate values between the minimum or zero values and the maximum values Kimax or Kvmax.

The passive filters represented in FIGS. 2 and 5 absorb the harmonic currents H5 and H11, but other types of passive filters can be used, notably low-pass, high-pass or band rejection filters.

In the embodiments described above the filtering devices are installed in single-phase AC circuits. But it is possible to use devices according to the invention in three-phase power systems or in DC power systems. In the case of DC power systems the terms "harmonics" and "fundamental" are replaced by the term "frequency band".

We claim:

1. A filtering device comprising:

an input terminal connected to an electrical power source, an output terminal connected to an electrical load and a common input-output terminal connected to the source and to the load;

passive filtering means and active filtering means connected in series between the input terminal and the common terminal of the filtering device, the output terminal being connected to the active filtering means;

the active filtering means comprising two terminals one of which is connected to the input terminal;

first monitoring means for monitoring the active filtering means;

current measuring means for supplying the first monitoring means with first signals representative of the input current of the filtering device;

second monitoring means for monitoring the active filtering means;

voltage measuring means for supplying the second monitoring means with second signals representative of the voltage at the terminals of one of the passive filtering means and both the active and passive filtering means connected in series, wherein the active filtering means generates a filtering voltage between the two terminals of the active filtering means based on the first and second monitoring means.

2. The filtering device according to claim 1, wherein the filtering voltage of the active filtering means is determined by the value of the first signals corrected by a first coefficient variable according to frequency, and by the value of the second signals corrected by a second coefficient variable according to frequency.

3. The filtering device according to claim 2, wherein the first coefficient has a low value at a frequency appreciably equal to the fundamental frequency of the source and a first predetermined high value for frequencies covering harmonics of said fundamental frequency, and the second coefficient has a low value at a frequency appreciably equal to the fundamental frequency of the source and a second predetermined high value for frequencies covering harmonics of said fundamental frequency.

4. The filtering device according to claim 2, wherein the first coefficient has a low value at a frequency appreciably equal to the seventh harmonic of the frequency of the source.

5. The filtering device according to claim 1, wherein the passive filtering means comprise filters tuned to the fifth harmonic and to the eleventh harmonic of the frequency of the source, and the active filtering means has a high filtering voltage for the fifth and eleventh harmonic of the frequency of the source.

6. The filtering device according to claim 2, wherein the first coefficient has a predetermined high value between one twentieth and five times a value representative of the impedance of compensating capacitors connected to the load, the impedance of the capacitors being determined for a frequency appreciably equal to the fundamental frequency of the source.

7. The filtering device according to claim 2, wherein the second coefficient has a predetermined high value lower than or equal to one.

8. The filtering device according to claim 1, wherein the output terminal of the filtering device is connected to a common point of the active filtering means and the passive filtering means connected in series.

9. The filtering device according to claim 1, wherein the output terminal of the filtering device is connected to the input terminal of the filtering device.

* * * * *